United States Patent [19]
Williams

[11] 3,744,382
[45] July 10, 1973

[54] PISTON STRUCTURE

[76] Inventor: Alvin D. Williams, 2253 Durfee Avenue, El Monte, Calif.

[22] Filed: Aug. 5, 1971

[21] Appl. No.: 169,265

[52] U.S. Cl. .................. 92/206, 92/243, 92/250, 92/258
[51] Int. Cl. ........................... F16j 1/00, F16j 1/06
[58] Field of Search ................. 92/206, 241, 242, 92/243, 250, 254, 248, 249, 258, 259

[56] References Cited
UNITED STATES PATENTS

| | | | |
|---|---|---|---|
| 174,280 | 2/1876 | Mooney | 92/206 |
| 2,211,455 | 8/1940 | Caldwell | 92/206 |
| 2,309,446 | 1/1943 | Ekkebus | 92/243 X |
| 2,386,668 | 10/1945 | Douglas et al. | 92/249 X |
| 2,596,516 | 5/1952 | Wellington | 92/243 |
| 3,068,054 | 12/1962 | Schmidt et al. | 92/250 X |
| 3,319,537 | 5/1967 | Pittman | 92/241 |

FOREIGN PATENTS OR APPLICATIONS

| | | | |
|---|---|---|---|
| 478,321 | 1/1938 | Great Britain | 92/243 |

*Primary Examiner*—Irwin C. Cohen
*Attorney*—J. Carroll Baisch

[57] ABSTRACT

A piston structure for hydraulic hoist cylinders for auto-transport equipment, the piston structure having sealing means of resilient material, the sealing means including a sealing element with an annular part which has a peripheral part disposed on the periphery of a metal disc having an axial opening therethrough. The sealing element has an outer peripheral part with parallel side walls and has an annular, wide-angle, V-shaped peripheral groove therein, the free annular edges of which are relatively sharp and adapted to slidingly engage the inner wall of the cylinder in which the piston is operably disposed. From the inner ends of the parallel side walls there are sides which taper inwardly at an angle of 27½° to an apex.

There is an annular support member at each side of the disc and sealing member, and the sides of the support members facing the seal and disc are annularly beveled at the periphery of said support members, the bevel being at an angle of 27½°; and when the support members and sealing means are assembled the beveled parts of the support members engage the tapered sides of the sealing element and support said sealing element against longitudinal movement relative to the piston assembly.

3 Claims, 5 Drawing Figures

PATENTED JUL 10 1973 3,744,382

Alvin D. Williams
INVENTOR.

BY J.C. Baird 3,744,382

PISTON STRUCTURE

BACKGROUND OF THE INVENTION

1. Field of the Invention

This invention relates generally to pistons for hydraulic jacks and the like, and relates more particularly to a piston structure for hydraulic hoist cylinders for autotransport equipment.

2. Description of the Prior Art

There are various piston structures for hydraulic hoists, jacks and the like, but these are generally complicated in structure and do not suitably meet the exacting requirements for hoists for autotransport equipment.

SUMMARY OF THE INVENTION

The invention comprises a piston structure for hydraulic hoist cylinders of auto-transport equipment. The piston structure has sealing means of resilient material such as neoprene, the sealing means including a sealing element, an annular part of which has parallel side walls and is disposed on the periphery of a metal disc having an axial opening therethrough. The periphery of the sealing element has an annular, wide-angle, V-shaped peripheral groove therein, the free annular edges of which are relatively sharp and adapted to slidingly engage the inner wall of a cylinder in which the piston is operably disposed. From the inner ends of the parallel side walls the sides of the sealing element are inclined or taper inwardly and from which there extends a coating of the resilient material, said coating covering one side of the metal disc.

There is a support member at each side of the disc and sealing member, and the sides of the support members facing the seal and disc are annularly beveled, the bevel being at the same angle as the sides of the sealing element; and when the support members and sealing means are assembled the beveled parts of the support members engage the tapered sides of the sealing element and longitudinally support the inner part of said sealing element. The sealing element is of greater diameter than the support members and that part of the sealing element having the parallel side walls is unsupported by the support members, although the latter tend to exert some pressure on the inclined sides of the sealing element, tending to urge the parallel-sided part thereof radially outwardly when the sealing means and the support members are operably assembled on the piston rod. The inner side of one of the support members has a face within the beveled peripheral part thereof which sealingly engages the coating on the one side of the metal disc. The other support member has an annular groove on the inner side in which an O-ring or the like is disposed and sealingly engages the uncoated side of the metal disc. The sealing means and support members are mounted on a reduced-diameter part of a piston rod, an outer end portion of which is threaded for reception of a nut for securing these parts on the reduced-diameter part of said piston rod. At the junction of the reduced-diameter part of the piston rod and the main part thereof, there is a shoulder and the adjacent side of the inner support member has a groove therein about the axial opening through said support member. A seal, such as an O-ring, is disposed in said groove and abuts against the shoulder when the piston structure is operably assembled.

OBJECTS AND ADVANTAGES OF THE INVENTION

It is an object of the present invention to provide a simple piston structure or assembly having a minimum number of parts.

It is another object of the invention to provide a structure of this character that is highly effective and reliable.

It is still another object of the invention to provide a piston structure of this charcter wherein internal leakage, as well as peripheral leakage, is eliminated.

It is a further object of the invention to provide a piston structure of this character wherein the parts are effectively held in place but which are readily removable for inspection, repairs and/or replacement of parts.

The characteristics and advantages of the invention are further sufficiently referred to in connection with the following detailed description of the accompanying drawings, which represent one embodiment. After considering this example, skilled persons will understand that variations may be made without departing from the principles disclosed and I contemplate the employment of any structures, arrangements or modes of operation that are properly within the appended claims.

BRIEF DESCRIPTION OF THE DRAWINGS

Referring to the drawings, which are for illustrative purposes only.

DESCRIPTION OF THE PREFERRED EMBODIMENT

Figure 1:
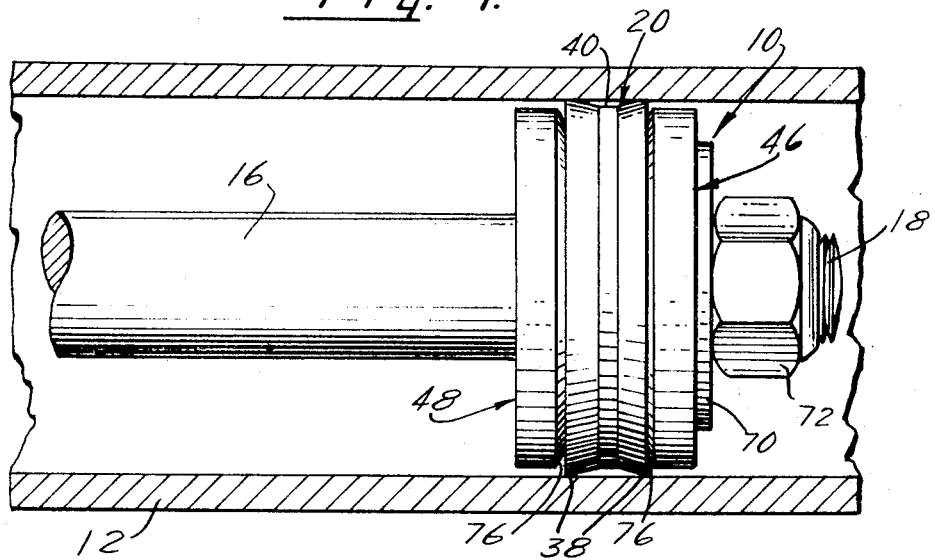
FIG. 1 is a sectional view of part of a cylinder with a piston embodying the present invention mounted on a piston rod and disposed in said cylinder.
Figure 3:
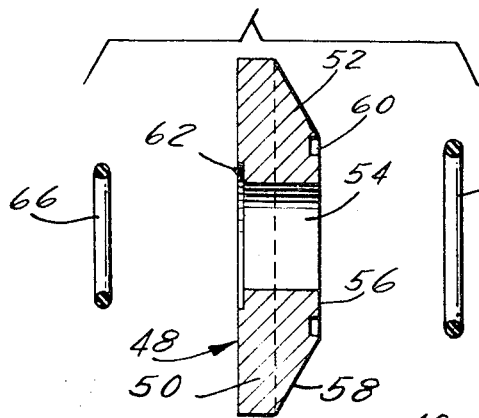
FIG. 3 is a sectional veiw of one of the support members showing the grooves therein for O-ring seals, said seals being shown at the respective side of said support member.
Figure 4:
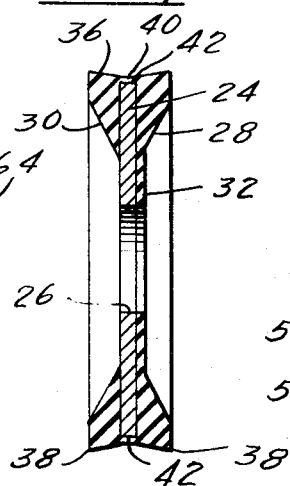
FIG. 4 is a sectional view of the sealing means.
Figure 5:
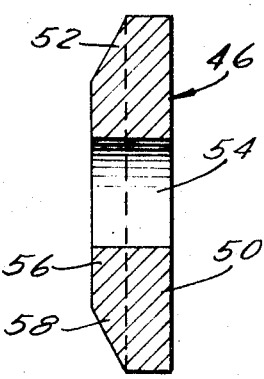
FIG. 5 is a sectional view of the other support member.

Referring more particularly to the drawings, there is shown in FIG. 1 a piston structure, indicated generally at 10, operably disposed in the cylinder 12. The piston structure or assembly is disposed on a reduced-diameter part 14 of a piston rod 16, said reduced-diameter part 14 having an externally-threaded free end portion 18.

The piston structure comprises a sealing means, indicated generally at 20, which includes an annular sealing element 22 mounted on a peripheral portion of a metal disc 24 having an axial opening 26 therein. The sealing element 22 has an outer annular part 26, the side walls of which are parallel and normal to the axis of the sealing means. From the inner ends of the parallel side walls of the part 26 said sealing element has oppositely-inclined side walls 28 and 30, said inclined side walls being inclined inwardly and toward each other. Inwardly of the inner end of the inclined side wall 28 there is a relatively thin layer of material 32 which is integral with the part 26. The sealing element and the layer 32 may be of any suitable material, although it has been found that neoprene is very satisfactory. This sealing element is, of course, bonded to the metal disc 24.

The outer periphery of the part 26 of the sealing element has an annular, wide-angle, V-shaped groove 36 therein, the free annular edges 38 of which are relatively sharp and adapted to slidingly engage the inner wall of the cylinder 10 in which the piston is operably disposed. The bottom 40 of the V-shaped groove 36 is cylindrical and parallel to the outer peripheral edge 42 of the metal disc 24. Thus, the material of the sealing element at the periphery of the metal disc is of uniform thickness relative to the edge of said disc.

There is an annular support member at each side of the sealing means, said support members being indicated respectively at 46 and 48.

Support member 46 has a cylindrical body part 50 and an inner part 52 that is frusto-conical in shape, the base of which joins the body part 50. Support 46 has an axial opening 54 for reception of the reduced-diameter part 14 of the piston rod. The smaller end 56 of the support member abuts against the layer 32 when the parts are assembled and the inclined surface 58 of the support member abuts against the adjacent inclined side wall 28 of the sealing element. The diameter of the support member 46 is smaller than the diameter of the sealing element so that there is an annular peripheral portion of the sealing element that extends radially beyond the periphery of the body 50 of the support member 46.

Support member 48 is similar to support member 46 and corresponding parts are given the same reference numerals. Support member 48 has an annular groove 60 in the smaller-diameter face 56, said groove 60 being concentric with the opening 54. In the opposite face of support member 48 there is an annular groove 62 that is concentric with the opening 54 through the support member 48 and extends into said opening 54, groove 62 being smaller than the groove 60.

Figure 2:
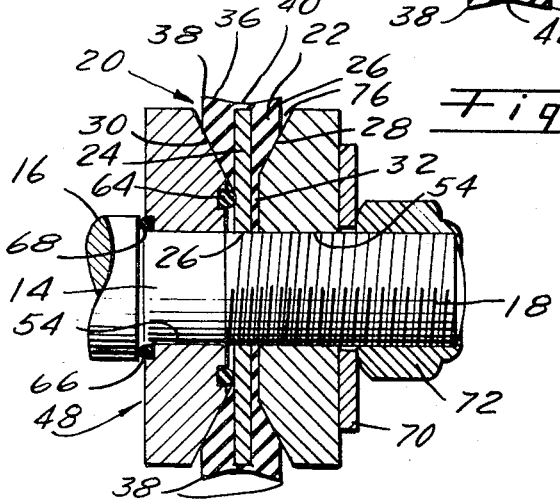
FIG. 2 is a sectional view of the piston structure mounted on a piston rod.

A seal 64, which is shown as an O-ring, is received in the groove 60 and when the parts of the piston structure are assembled the O-ring 64 engages the adjacent side of the metal disc 24. A seal 66, shown as an O-ring, is disposed in the groove 62 and when the piston structure is assembled on the piston rod seal 66 engages a shoulder 68 at the junction of the reduced-diameter part 14 of the piston rod and the larger-diameter part thereof. With the parts of the piston structure assembled on the reduced-diameter part 14 of the piston rod, a washer 70 is disposed on the reduced-diameter part 14 and abuts against the adjacent side of the support member 46, and the nut 72 is threadably disposed on the threaded part of the reduced-diameter portion 14 and when said nut is tightened the piston structure is operably secured together, as shown in FIGS. 1 and 2. It will be noted that the inclined face 58 of the support member 48 is in engagement with the inclined side wall 30 of the sealing element.

When the piston structure is operably assembled the sealing means is clamped between the support members 46 and 48. However, the part 26 of the sealing element is not compressed, the inclined side walls 28 and 30 being held closely so that the sealing element will be retained in position. It is to be noted that the inclination of the sides 28 and 30 of the sealing element and the inclination of the faces 58 of the support members 46 and 48 may be of any suitable angle. However, it has been found that an angularity of 27½° for these inclined parts is very satisfactory.

As shown in FIGS. 1 and 2, the diameter of the sealing means is greater than the diameter of the support members so that there is a peripheral portion of the part of the sealing element having the parallel sides or side walls that extend radially outwardly of the periphery of said support members so that the free annular edges of the wide-angle, V-shaped peripheral groove 36 engage the inner wall surface of the cylinder 12 while the peripheries of the support members 46 and 48 are spaced from said wall.

That portion of the sealing element having the parallel side walls is free from engagement with the adjacent parts of the support members 46 and 48, as indicated at 76 in FIGS. 1 and 2.

The invention and its attendant advantages will be understood from the foregoing description and it will be apparent that various changes may be made in the form, construction an arrangement of the parts of the invention without departing from the spirit and scope thereof or sacrificing its material advantages, the arrangement hereinbefore described being merely by way of example, and I do not wish to be restricted to the specific forms shown or uses mentioned, except as defined in the accompanying claims.

I claim:

1. A piston structure, comprising:
   A. sealing means including
      a. an annular sealing element of resilient material having an annular part with parallel sides normal to the axis of said sealing element and from which inclined side walls extend inwardly and toward each other;
   B. a rigid disc having an axial opening therein, the sealing element being disposed on and bonded to a peripheral portion of said disc, there being a layer of said resilient material integral with said sealing element on and bonded to one side of the disc;
   C. an annular supporting member at each side of the sealing means, said supporting members being of smaller diameter than the annular sealing element, each of said supporting members being annularly beveled on their inner sides, the beveled portions being at the periphery of the supporting members with a central inner side portion within the beveled portion normal to the axis of the supporting members, each of said supporting members having an axial bore therethrough;
      a. the supporting member at one side of the sealing means having the central inner side portion engaging the layer of resilient material on the one side of the rigid disc;
      b. the beveled parts of the support members engaging the entire inclined side walls of the sealing element, and the parallel sides of the annular part of the sealing element being clear of the supporting members;
      c. and the support member at the other side of the rigid disc has an annular groove in its central inner side portion within the beveled portion, and there is a sealing ring disposed in said groove and in sealing contact with the adjacent side of the rigid disc when the piston structure is operably assembled;
   (D) and means for exerting clamping pressure on said supporting members for effecting compressive force on that portion of the sealing element engaged by the supporting members.

2. The invention defined by claim 1 wherein the periphery of the sealing element is in the shape of a wide "V" in cross section and the outer annular edges of the "V" are relatively sharp.

3. The invention defined by claim 2, wherein the rigid disc is of metal and has a cylindrical periphery, and the central part of the wide "V" of the sealing element is parallel to the periphery of said disc.

* * * * *